March 24, 1970     H. F. STEWART ET AL     3,502,878
AUTOMATIC X-RAY APPARATUS FOR LIMITING THE FIELD SIZE
OF A PROJECTED X-RAY BEAM IN RESPONSE TO FILM
SIZE AND TO SOURCE-TO-FILM DISTANCE
Filed Sept. 22, 1967     2 Sheets-Sheet 1
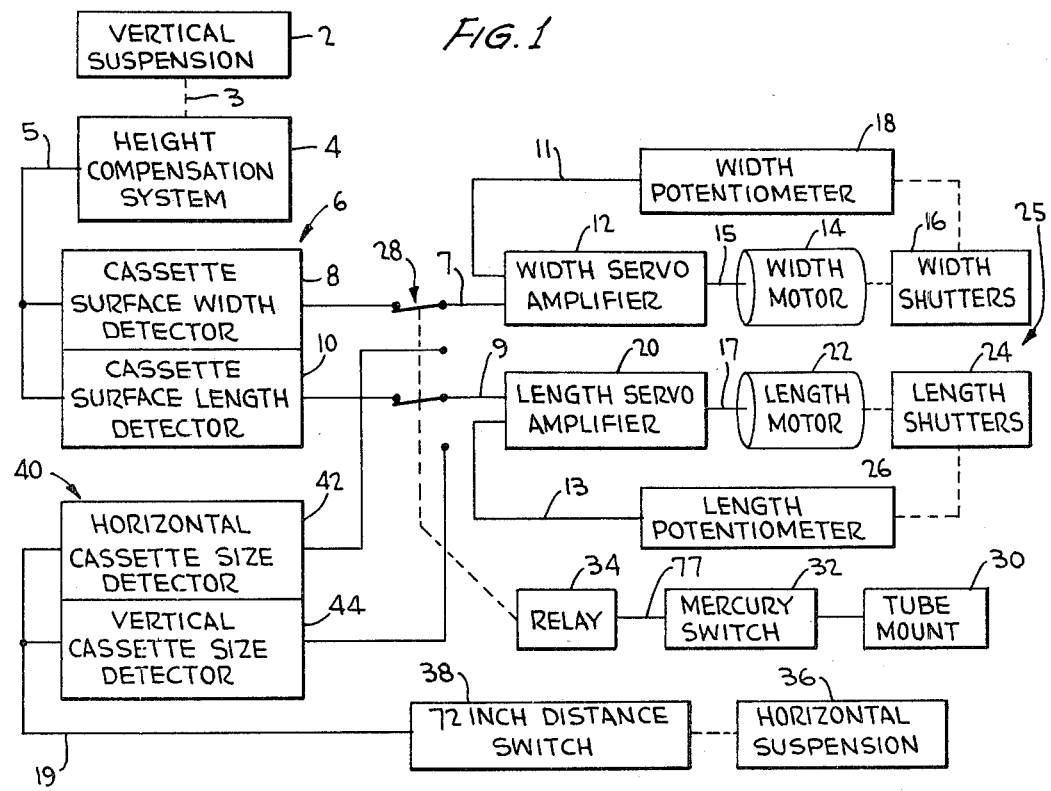
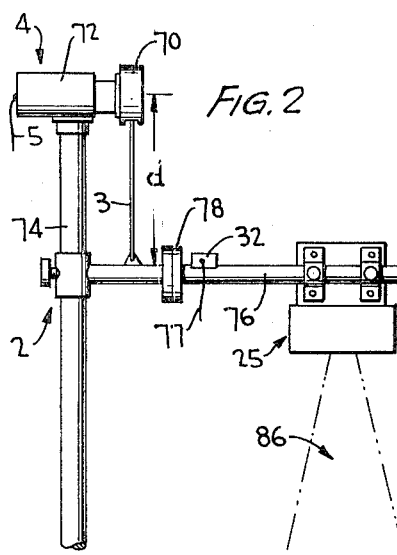
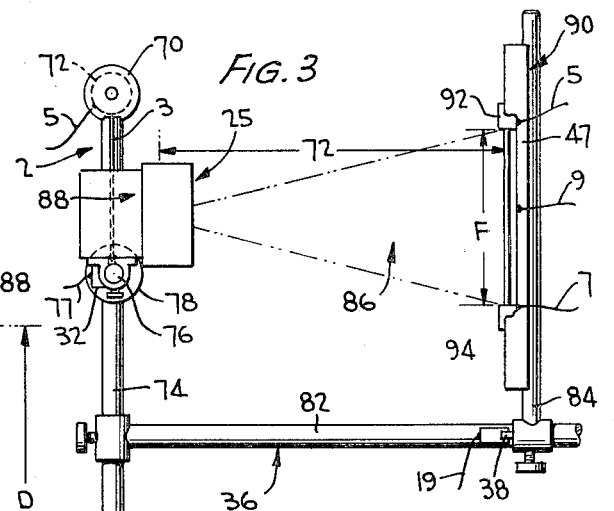
INVENTORS,
HAROLD F. STEWART
RAY L. WALCHLE
BY Jacobi & Davidson
ATTORNEYS March 24, 1970    H. F. STEWART ET AL    3,502,878
AUTOMATIC X-RAY APPARATUS FOR LIMITING THE FIELD SIZE
OF A PROJECTED X-RAY BEAM IN RESPONSE TO FILM
SIZE AND TO SOURCE-TO-FILM DISTANCE
Filed Sept. 22, 1967    2 Sheets-Sheet 2
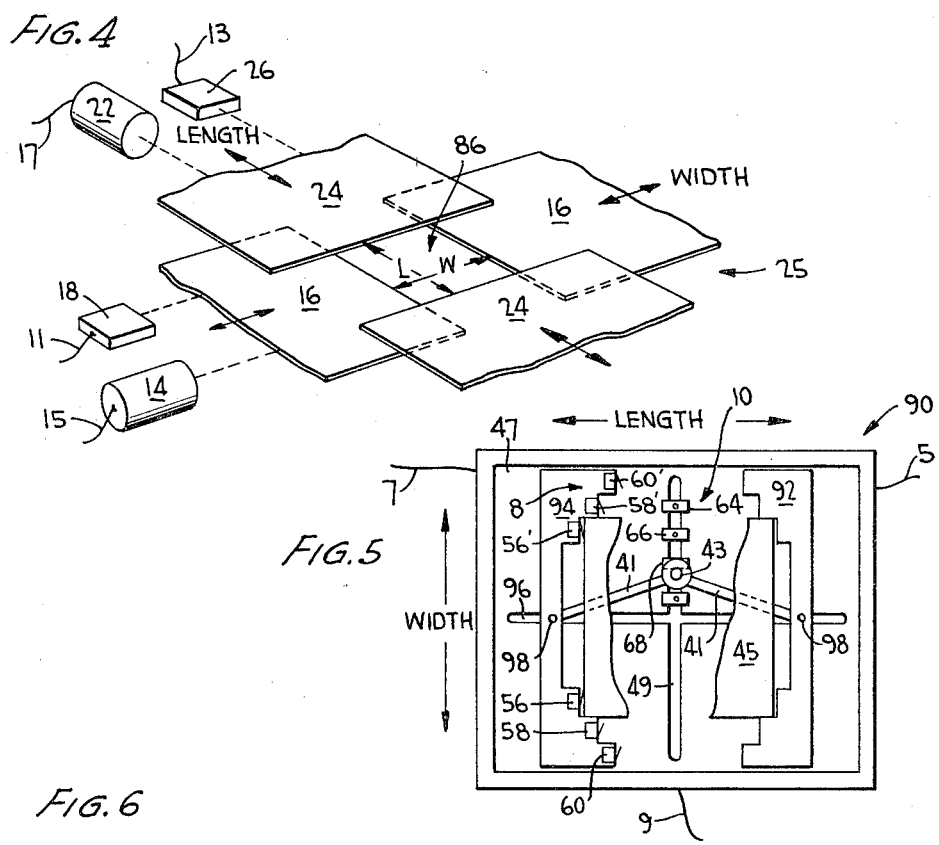
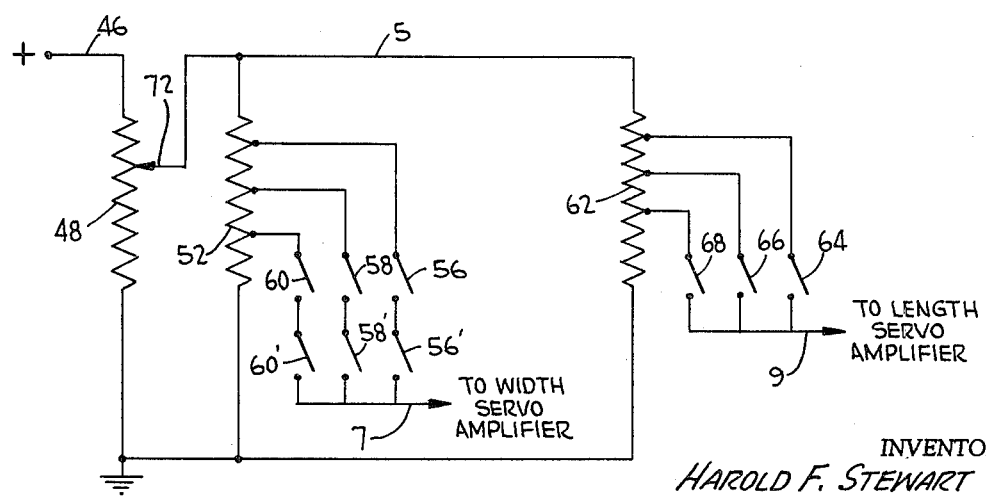
INVENTORS,
HAROLD F. STEWART
RAY L. WALCHLE
BY Jacobi & Davidson
ATTORNEYS

United States Patent Office

3,502,878
Patented Mar. 24, 1970

3,502,878
AUTOMATIC X-RAY APPARATUS FOR LIMITING THE FIELD SIZE OF A PROJECTED X-RAY BEAM IN RESPONSE TO FILM SIZE AND TO SOURCE-TO-FILM DISTANCE
Harold F. Stewart and Ray L. Walchle, Rockville, Md., assignors to the United States of America as represented by the Secretary, Department of Health, Education, and Welfare
Filed Sept. 22, 1967, Ser. No. 669,830
Int. Cl. H05g 1/26
U.S. Cl. 250—105         5 Claims

ABSTRACT OF THE DISCLOSURE

An X-ray field size limiting system wherein the size of a projected beam or field from an X-ray source is automatically limited to the size of a recording film cassette. The automatic operation compensates for changes in source-to-film distance as well as changes in film cassette size. Servo-system techniques are employed to control the aperture of a field size limiting diaphragm or shutter means in response to signals produced by both a film or cassette size sensing means and a source-to-film distance sensing means.

BACKGROUND OF THE INVENTION

This invention relates to X-ray systems, and more particularly relates to X-ray field size limiting systems which serve to automatically limit the size of an X-ray beam or field to the size of the recording film being used for a particular radiograph.

The average radiation level to which the general population is exposed has been a subject of concern and has received much attention in recent years due to the risk of genetic damage to future generations which accompanies human radiation exposure. A great percentage of the total radiation level to which the population is exposed is produced by man-made sources of radiation. Since medical exposure to X-rays represents the single largest man-made source of radiation reaching the general population, medical X-rays thus greatly contribute to this risk of genetic damage.

Obviously, though, the utilization of medical X-rays cannot and should not be eliminated considering their advantageous diagnostic value. However, steps can be taken to improve existing X-ray techniques and equipment and to develop new X-ray techniques and equipment that will not only reduce or eliminate unnecessary radiation exposure, but will result in higher quality radiographs for lower total radiation exposure levels than that present today. The principal cause of unnecessary radiation exposure during diagnostic radiology has been found to be excessive size of the projected X-ray beam or field. Excessive projected field size, that is a field size greater than the size of the recording X-ray film or film cassette, oftentimes results in direct and unnecessary radiation exposure to the human gonads, thus producing genetically harmful effects.

In an effort to reduce or eliminate this principal cause of unnecessary radiation exposure, radiology techniques and equipment have been developed in the prior art that are designed to collimate or limit the projected beam or field size from a diagnostic source of X-rays. Existing techniques and associated equipment, although quite capable of performing a field size limiting or collimating function, have met with little practical success due to their lack of versatility and lack of automatic operation. An example of this lack of success can be found in the results of a study recently completed by the United States Public Health Service of over 4,000 radiographic exposures, wherein it was indicated that 21% of the examinations had a beam or field size greater than twice the recording film size and that fully 9% had a beam or field size greater than 4 times the film size. In the case of chest radiography, an inspection program conducted in New York City revealed that 50% of the X-ray beams or fields exceeded 33 inches in size. Epp, Weiss, and Laughflin, in an article entitled "Measurement of Bone Marrow and Gonadal Dose From the Chest X-ray Examination as a Function of Field Size, Field Alignment, Tube Kilovoltage and Added Filtration," appearing in Brit. J. Radiol. 34: 85–100 (1961), found that if such a beam or field is positioned so that the ovaries or testes are directly irradiated, the resulting gonadal exposures are respectively 80 and 400 times higher than the exposure experienced with an X-ray field or beam size properly limited to the size of the recording film utilized.

As should be apparent, there still exists a need for an X-ray technique and system whereby proper collimation or limiting of the X-ray beam or field size can be insured even during routine diagnostic procedures. Accordingly, it is a primary object of the subject invention to satisfy this need. Other and more specific objects of the instant invention are as follows:

(a) The provision of an X-ray field size limiting system which automatically adjusts for varying film sizes;

(b) The provision of an X-ray field size limiting system which is automatically adaptable to varying target-to-film distances;

(c) The provision of an automatic X-ray field size limiting system which is simple to operate; and (d) The provision of an automatic X-ray field size limiting system which can be installed on different types of existing X-ray units.

From another standpoint, proper collimation and limiting of an X-ray beam or field, in addition to eliminating unnecessary exposure during diagnostic radiology, results in a radiograph of extremely high quality, that is, of high information content. High quality radiographs are extremely important for proper diagnosis and cannot be readily obtained when field sizes are excessive. When X-rays strike a patient, some rays are naturally scattered diffusely in all directions. Accordingly, a patient broadly irradiated becomes a source of much useless radiation which tends to produce a general fogging of the recorded image upon the film and does not contribute to the film information content. A fogged radiograph is diagnostically confusing since the contrast between gradations in the image is much reduced so that medically significant discontinuities and the like may easily be overlooked. A properly collimated or limited X-ray beam or field on the other hand, naturally reduces the degree of scattered radiation which can reach the film and thus considerably reduces the fogging of the recorded image.

Accordingly, it is another object of the instant invention to provide an automatic X-ray field size limiting system which produces high quality radiographs.

SUMMARY OF THE INVENTION

The above and other objects of the instant invention are implemented by the physical embodiments thereof as there is provided an X-ray field size limiting system for an X-ray apparatus wherein the size of the projected X-ray beam or field is automatically limited to the size of the recording film. The inventive system takes into consideration both the film or cassette size and the X-ray source-to-film distance. Thus, unnecessary radiation exposure to the patient during diagnostic radiography is eliminated.

Specifically, the invention contemplates the provision of a diaphragm or shutter means or mechanism located between a source of X-rays and a recording film cassette holder, the shutter means limiting the size or area of the projected X-ray field in response to an output from an electrical control means. Sensing means are provided for sensing the size of a film cassette within the film cassette holder as well as for sensing the distance between the source of X-rays and the film cassette holder. Signals indicative of film or cassette size and source-to-film distance are produced by the sensing means and are fed to the control means whereby the shutter means or mechanism is automatically actuated to limit the size or area of the projected X-ray field in response thereto.

A further feature of the instant invention is the provision of a film cassette holder modified to include film or cassette size sensing means therein and to produce the control signals. The film cassette holder utilizes as its basic component a standard Bucky tray. A pair of clamping means are slidably mounted within the tray and are adapted to engage or clamp opposite sides of a film cassette and to center a film cassette within the tray portion. A plurality of electrical switch means are carried on one of the clamping means and are adapted to be actuated in pairs by corner edges of a film cassette therein, different pairs of switch means being actuated by cassettes of different size. These electrical switch means function as a sensing mechanism and, when actuated, produce a signal indicative of the "width" of the surface area of the film cassette. Additional switches are selectively actuated when the clamping means are in various positions to give a signal indicative of the "length" of the surface area of the film cassette.

The inventive system provides for the use of an X-ray apparatus in a vertical position for table work and in a horizontal position for chest radiography. When the X-ray apparatus is in the horizontal position, the sensing means which senses the distance between the source of X-rays and the film cassette holder is automatically disabled and a signal representative of a fixed source-to-film distance is substituted therefor. This is necessary since horizontal radiographs such as chest X-rays are normally taken at a standard, fixed source-to-film distance of 72 inches.

BRIEF DESCRIPTION OF THE DRAWINGS

The above features of the subject invention will be more fully understood when reference is had to the following detailed description thereof in conjunction with the accompanying drawing wherein:

FIGURE 1 is a schematic illustration of a complete automatic X-ray field size limiting system;

FIGURE 2 is a perspective view of an X-ray apparatus equipped with the inventive automatic X-ray field size limiting system, the apparatus producing a field projected in the vertical direction, parts being broken away for illustrative convenience and clarity;

FIGURE 3 is a perspective view of an X-ray apparatus equipped with the inventive automatic X-ray field size limiting system, the apparatus being utilized in a horizontal position, parts of this view being likewise broken away for illustrative convenience and clarity;

FIGURE 4 is a schematic illustration of the operation of shutter means or mechanisms suitable for use with the inventive automatic X-ray field size limiting system;

FIGURE 5 is a plan view of a modified film cassette holder constructed in accordance with the invention, this view being taken in the direction of lines 5—5 of FIGURE 2, parts being shown in phantom for illustrative clarity; and FIGURE 6 is an electrical schematic of a circuit suitable for use within the modified film cassette holder of the automatic X-ray field size limiting system for producing control signals indicative of film cassette size.

DESCRIPTION OF THE PREFERRED EMBODIMENTS

Turning now to the drawings, and particularly to FIGURES 2 and 3 thereof, the basic concepts behind the design of the subject invention should become readily apparent. A source of X-rays generally designated 88 is disclosed as providing a projected X-ray beam or field projection 86 within the dotted lines. A film cassette holder 90 containing a film cassette 45 is placed within the path of the projected X-ray beam or field 86 such that the X-ray field defines an area of projection designated F on the surface of the film cassette 45. In the illustrations of FIGURES 2 and 3, the surface area of the film cassette 45 and the area of projection F of the X-ray field 86 upon the film are disclosed as being equal. Accordingly, in the illustrated examples, no excessive or unnecessary radiation is produced.

However, if the size or surface area of the film cassette 45 were decreased, then the area of projection F of the X-ray field 86 would be greater than the surface area of the film cassette 45 thus resulting in harmful excessive radiation and image fogging. Alternatively, if the surface area or size of the film cassette 45 were increased, then the area of projection F of the X-ray field 86 would be less than the surface area of the film cassette 45, thus resulting in an incompletely exposed radiograph. As is apparent in both hypothetical examples, the area of projection F of the X-ray field 86 must be respectively decreased and increased proportionally as the surface area of the film cassette 45 increases and decreases in order to maintain a properly limited field size.

The control of the area of projection F of the X-ray field 86 can easily be effected by diaphragm means or shutters, for example those generally designated 25, placed between the source of X-rays 88 and the film cassette holder 90. Thus, if the area of projection F of the X-ray field 86 were to be decreased, shutters 25 could be closed to define a narrow aperture thus decreasing the projected area of the X-ray field 86. Alternatively, if the area of projection F of the X-ray field 86 were to be increased, then shutters 25 could be opened to define a wide aperture thus increasing the projected area of the X-ray field 86. The subject invention contemplates the provision of automatic control of the shutter opening as the size of the film cassette 45 within the cassette holder 90 varies.

A further difficulty is encountered in attempting to maintain proper field size if, in addition to being presented with film cassettes 45 of varying surface area or size, the source-to-film distance D also is varied. Quite obviously, a shutter opening providing a correct X-ray area of projection F at a fixed source-to-film distance D would not provide a suitable field projection if the source-to-film distance D varied from the fixed setting. Additional adjustments of the shutter opening must be effected to compensate for varying source-to-film distance as well as for varying film cassette size. Accordingly, the subject invention contemplates the provision of automatic control of the shutter opening compensating for changing source-to-film distance as well as for varying film cassette size.

The above design concepts are manifested in the inventive automatic X-ray field size limiting system depicted in the block diagram of FIGURE 1. Shutter means 25 are provided to limit the area of projection F of the X-ray field 86. Automatic control of the shutter means is effected by appropriation of servo-system techniques. Initially, the size or surface area of film cassette 45 is determined by a sensing means generally designated 6 preferably contained within a film cassette holder. The sensing means generates a first control signal from a cassette surface "width" detector 8 indicative of film cassette surface "width" and a second control signal from a cassette surface "length" detector 10 indicative of film cassette surface "length." Two such measurements, that is one of cassette surface "width" and one of cassette surface "length" are sufficient to define the area of a film cassette 45 since, as commonly used, film cassettes are generally of rectangular shape. The first control signal produced by the cassette surface "width" detector 8 is delivered to a "width" servo-amplifier designated 12 through switching means 28 and conductor 7. The second control signal produced by the cassette surface "length" detector 10 is similarly delivered to a "length" servo-amplifier 20 through the switching means 28 and conductor 9. The output 15 from the "width" servo-amplifier 12 drives a "width" servo-motor 14 which is mechanically connected to the shutter means 25 and controls the opening of the "width" shuttters 16 therein. In a similar manner, the output 17 from the "length" servo-amplifier 20 drives a "length" servo-motor 22 which is mechanically connected to the shutter means 25 and controls the opening of "length" shutters 24 therein. Operation of the "width" and "length" shutters provides a rectangular X-ray field corresponding to a rectangular film cassette.

Completing the basic servo-system, a "feedback loop" is provided for both the "width" shutters 16 and the "length" shutters 24. Specifically, a "width" potentiometer 18 is mechanically connected to the "width" shutters 16 and produces a "feedback" or reference signal along conductor 11 indicative of the position of the "width" shutters 16. This "feedback" or reference signal provides the reference input to the "width" servo-amplifier 12. Similarly, the "feedback" loop for the "length" shutters 24 consists of a "length" potentiometer 26 mechanically connected to the "length" shutters 24 which provides a "feedback" or reference signal to the "length" servo-amplifier 20 through conductor 13.

The system as thus far described provides automatic limiting of the area of projection of an X-ray field in response to and in proportion with film cassette size. Initially, in the absence of a film cassette 45 within the cassette holder 90, the shutter means are closed. A standard lamp and mirror assembly can be utilized to generally position the film cassette holder and patient within the field of X-ray projection. When a film cassette 45 is placed into the film cassette holder 90, the cassette surface "width" detector 8 and the cassette surface "length" detector 10 produce first and second signals indicative of the surface area dimensions of the film cassette. These signals are sent into the respertive "width" and "length" servo-amplifiers 12 and 20. Servo-amplifiers 12 and 20 respectively, drive the servo-motors 14 and 22 and the "width" and "length" shutters 16 and 24 begin to open. However, as the "width" and "length" shutters 16 and 24 open, the setting of their respective "feedback" potentiometers 18 and 26 is altered, thus changing the value of the "feedback" or reference signals delivered to servo-amplifiers 12 and 20 by conductors 11 and 13 respectively. When the first signal produced by the cassette surface "width" detector 8 is balanced or nullified by the reference signal produced by the "width" potentiometer 18, the output 15 of the "width" servo-amplifier 12 goes to zero, thus stopping the "width" servo-motor 14 and holding the "width" shutters 16 in their properly set opened position. Naturally, a similar mode of operation is evident for the servo-loop including the "length" shutters 24, the "length" potentiometer 26, the "length" servo-motor 22, and the "length" servo-amplifier 20. If the size of the film cassette 45 within the film cassette holder 90 is varied, the system will automatically respond to produce new shutter openings which limit the area of projection of the X-ray field to the surface area of the film cassette.

However, as mentioned above, compensation must also be provided for changing X-ray source-to-film distance as well as for varying film cassette size. Such compensation is effected when an X-ray apparatus is operated in a vertical mode by a height compensation system 4 which is mechanically attached to the standard vertical suspension 2 of an X-ray apparatus. The height compensation system 4 effectively "measures" the distance $d$ which is proportional to source-to-film distance D as depicted in FIGURES 2 and 3. The output 5 from the height compensation system 4 is proportional to source-to-film distance and influences equally the value of both the first and second signals produced by the cassette surface "width" detector 8 and the cassette surface "length" detector 10, respectively. Thus, with the addition of height compensation system a completely automatic control of X-ray field size can be effected.

The inventive system is adaptable to conform to standard radiography procedure when diagnostic chest X-rays are to be taken. In this instance, the inventive X-ray beam or field size limiting system makes provisions for the disabling of the height compensation system 4 as discussed above. The disabling of the height compensation system 4 takes place when the X-ray apparatus is in a position to provide a horizontal beam or field direction and is effected by the provision of a mercury switch 32 positioned in a suitable manner upon an X-ray tube mount generally designated 30. When the X-ray tube mount 30 is turned to position the projected X-ray field in a horizontal direction, switch 32 is actuated and serves to actuate relay 34 which, in turn actuates switching means 28 to change the contacts thereof from the sensing means generally designated 6 to the sensing means generally designated 40. Sensing means 40 is depicted as comprising a "horizontal" cassette size detector 42 and a "vertical" cassette size detector 44. Size detector 42 corresponds in operation to "width" detector 8 and, in a similar manner, size detector 44 corresponds in operation to "length" detector 10 in that each produces a signal indicative of film cassette size.

A "72 inch" distance switch 38 mechanically attached to a typical horizontal suspension 36 of an X-ray apparatus is substituted for the height compensation system 4 attached to the vertical suspension system 2 of an X-ray apparatus. This is provided since chest X-rays are normally taken at such a standard distance. The "72 inch" distance switch 38 provides a fixed output biasing signal 19 which influences the value of a first signal output from the "horizontal" cassette size detector 42 as well as the value of a second signal output from the "vertical" cassette size detector 44. As is schematically depicted, the first and second signal outputs are applied to inputs 7 and 9 respectively of the "width" servo-amplifier 12 and the "length" servo-amplifier 20. Accordingly, the system operation when the X-ray apparatus provides a field projection in the horizontal position is virtually the same as the operation when the X-ray apparatus is in the vertical position as discussed above. The one exception is that compensation for the X-ray source-to-film distance D is not taken into consideration in the same manner since a varying biasing signal is not produced. This distance is fixed at 72 inches as mentioned above and a fixed biasing signal is applied to the sensing means 40.

Referring to FIGURE 4, a schematic illustration of the physical operation of the shutter means 25 can be found. So as to produce a rectangular aperture and area of projection of the X-ray field, "width" shutters 16 and "length" shutters 24 are provided. Although not specifically illustrated, opposing shutters 16 are preferably mechanically linked together as are opposing shutters 24, such that movement of one of the shutters 16 or 24 provides an equal and opposite movement of the corresponding opposing shutter 16 or 24 respectively. The respective "width" and "length" servo-motors 14 and 22 can be attached to the shutter mechanisms in any suitable manner, likewise, the respective "width" and "length" potentiometers, which may be of the single turn variety, can be mechanically coupled to the shutter mechanisms in any fashion although a non-illustrated pulley and cable arrangement is preferred. Although a rectangular area of X-ray field projection F is produced with the illustrated "width" and "length" shutter mechanisms those familiar with the X-ray art will appreciate that other shutter configurations could well be utilized to produce any desired configuration of the projected X-ray field. The important consideration is merely that a shutter mechanism is provided which is capable of limiting the area of projection of an X-ray field to the surface area of a film cassette. Of course, alternative forms of shutter mechanisms must be capable of operating in response to a motor.

A preferred physical location of the various components comprising the inventive automatic X-ray field size limiting system is illustrated in FIGURES 2 and 3, the X-ray apparatus projecting a beam or field in a vertical direction in FIGURE 2 and in a horizontal direction in FIGURE 3. The source of X-rays 88 and shutter means 25 are operably positionable upon a typical vertical suspension system 2 of an X-ray apparatus. The vertical suspension system 2 is schematically illustrated as constituting a simple rod or shaft 76 upon which the source of X-rays 88 and associated shutter means 25 is movably attached. Rod or shaft 76 is rotatable about a clutch or pinning arrangement 78 such that the projected field 86 of the source of X-rays 88 is positioned in either the vertical direction or in the horizontal direction. The vertical suspension system 2 is slidably mounted upon a vertical shaft 74 such that the source-to-film distance D can be changed as desired.

The height compensation system 4 is depicted as comprising a potentiometer 72 which may, for example, comprise a ten-turn potentiometer operable by a gearing arrangement rotated by a spring-loaded spool assembly 70. A cord or cable 3 is depicted as being attached to the spring-loaded spool assembly 70 as well as to the rod or shaft 76 of the vertical suspension system 2. Thus, as the rod or shaft 76 is moved up or down in the vertical direction to change the distance D between the source 88 and the film 45, the cord or cable 3 attached to the shaft 76 is lengthened or shortened in a proportional manner to rotate the spring-loaded spool assembly 70 and consequently adjust the setting of potentiometer 72. The output 5 from potentiometer 72 provides the height compensation biasing signal which influences the cassette size detecting signals as discussed.

An illustrative horizontal suspension system of the X-ray apparatus is shown in FIGURE 3 and is generally designated 36. The horizontal suspension system 36 is schematically depicted as comprising a horizontal shaft 82 upon which is attached a supporting means 84 for the film cassette holder 90. The supporting means 84 is depicted as being movable upon shaft 82. When the supporting means 84 is moved a distance of 72 inches from the source of X-rays 88, the 72 inch distance switch 38 is actuated producing a constant biasing output 19. The height compensation system is disabled by the mercury switch 32 illustratively attached to the supporting shaft 76 for the X-ray source 88. Accordingly, when shaft 76 is rotated so that the projected X-ray beam or field 86 is in the horizontal direction, the mercury switch 32 is actuated thus actuating relay 34 and disabling the height compensation system 4 as discussed.

An exemplary film cassette holder 90 constructed in accordance with the subject invention is illustrated in FIGURE 5. Film cassette holder 90 is preferably a modified Bucky tray and comprises a bottom tray portion 47 preferably containing a groove or slot 96 extending in the direction of film cassette "length" and a groove 49 extending in the direction of film cassette "width." A pair of clamping means 92 and 94, preferably constructed of brass, are slidably mounted within the tray portion 47 and are maintained in proper position by pins 98 therein extending into the groove or slot 96. Each of the clamping means 92 and 94 are connected together through a bride supporting arrangement 41 such that clamping means 92 and 94 are restrained for equal and opposite movement. Each of the clamping means 92 and 94 includes a plurality of notches along one edge thereof as illustrated thereby defining a substantially staircase-like structure, selective notches being adapted to receive the corner edges of a film cassette 45 of any standard size placed within the cassette holder 90.

The cassette size sensing means are provided within the film cassette holder, and comprise a plurality of electrical switch means arranged in illustrative pairs 60 and 60'; 58 and 58'; and 56 and 56'; for example, placed within the various notches of the staircase-like structure of one of the clamping means 94. Each pair of the plurality of electrical switch means are connected in series to various tapped positions along a resistor 52 such as is illustrated in FIGURE 6 and as will be discussed more thoroughly below. The plurality of electrical switch means along with the resistor arrangement constitutes the cassette surface "width" detector 8 and produces the first signal indicative of cassette surface "width" along conductor 7.

An additional plurality of electrical switch means 64, 66 and 68, are attached along groove 49 on tray portion 47. Pinning means 43 which pivotally connects together both sides of the bridge supporting arrangement 41, is adapted to ride within the groove 49 and to selectively actuate various ones of switches 64, 66 and 68 depending upon the distance between the clamping means 92 and 94, that is depending upon the surface area "length" of the film cassette 45. Each of the additional plurality of electrical switch means 64, 66 and 68 are connected along various points of a second resistor, for example resistor 62 of FIGURE 6. Thus, when switches 64, 66 and 68 are actuated by the motion of the pinning means 43 in groove or slot 49, the second signal 9 is produced indicative of cassette surface "length." Accordingly, the additional plurality of electrical switch means 64, 66 and 68, along with its associated resistor 62, constitutes the cassette surface "length" detector 10.

An illustrative resistive circuit arrangement contained within the film cassette holder 90 and utilized in conjunction with the above electrical switch means is depicted in a schematic fashion in FIGURE 6. A source of voltage 46 is applied across a first resistor 48. Potentiometer 72 of the height compensation system 4 is connected to this first resistor 48 and provides at an output conductor 5 thereof, a voltage proportional to the position of the potentiometer 72 and thus the source-to-film distance. This voltage is, in turn, applied across resistor 52 of the cassette surface "width" detector 8 and across resistor 62 of the cassette surface "length" detector 10. The plurality of cassette surface "width" detecting switches 56, 58, 60, and 56', 58', and 60' are connected in series pairs 56–56'; 58–58'; 60–60'; between various points along resistor 52 and conductor 7 leading to the "width" servo-amplifier 12. As is apparent, when both switches of a pair, for example switch 60 and 60', are actuated by the corner edges of a film cassette 45 placed into the notches of the clamping means 92 and 94 of the film cassette holder 90, a voltage signal will be applied to conductor 7 proportional to the "width" of the film cassette surface. Similarly, switches 64, 66 and 68 of the cassette surface "length" detector 10 are tapped into various positions along resistor 62 and, when these switches are actuated, produce different voltages indicative of the "length" of the cassette surface. These voltages appear on conductor 9 and are coupled to the "length" servo-amplifier 20.

As is apparent, film cassette holder 90 is quite versatile as it is adapted to accept a film cassette 45 of virtually any of the standard sizes, the corners of the film cassette 45 fitting into various pairs of the plurality of notches in the staircase-like structure of clamping means 92 and 94 to thus actuate respective pairs of switches in the cassette surface "width" detector 8. As the pair of clamping means 92 and 94 are moved closer together or farther apart depending upon the "length" of the film cassette 45, pinning means 43, sliding in groove or slot 49, actuates various ones of the electrical switches included in the cassette surface "length" detector 10 to provide a suitable signal to the "length" servo-amplifier 20. Additionally, the arrangement of the height compensation system 4 constituting potentiometer 72 is such that the voltages applied across the resistors 52 and 62 respectively contained in the "width" detector 8 and the "length" detector 10 are set to various levels to thus compensate for the X-ray source-to-film distance. It is to be understood, however, that other circuit arrangements performing the required function could be substituted for the circuit specifically discussed above.

It should now be apparent that the objects initially set forth at the outset of this specification have been successfully achieved. Accordingly, what is claimed is:

1. An automatic field size limiting system for an X-ray apparatus comprising:
   a source of X-rays for producing a projected field;
   a film cassette holder located in the path of said projected field;
   diaphragm means located between said source of X-rays and said film cassette holder for limiting the size of said projected field;
   first sensing means for sensing the size of a film cassette within said film cassette holder;
   second sensing means for sensing the distance between said source of X-rays and said film cassette holder; and
   control means for automatically operating said diaphragm means in response to both said first and second sensing means;
   said first sensing means sensing the surface dimensions of a film cassette within said film cassette holder;
   said first sensing means producing a first signal indicative of film surface width and a second signal indicative of film surface length;
   said diaphragm means comprising a first diaphragm mechanism for limiting the width of the area of said projected field and a second diaphragm mechanism for limiting the length of the area of said projected field;
   said control means operating said first diaphragm mechanism in response to said first signal produced by said first sensing means and operating said second diaphragm mechanism in response to said second signal produced by said first sensing means; and
   said second sensing means producing a variable biasing signal proportional to the distance between said source of X-rays and said film cassette holder, said variable biasing signal influencing both said first and second signals produced by said first sensing means to compensate for said source-to-film distance.

2. A system as defined in claim 1, wherein said control means comprises first and second differential amplifier means each including a control input, a reference input, and an output; servo-motor means operatively connected to said first and second diaphragm mechanisms and respectively actuated by said outputs of said first and second differential amplifier means; feedback means for sensing the position of said diaphragm means, said feedback means being respectively connected between said first and second diaphragm mechanisms and said corresponding reference inputs of said first and second differential amplifier means; and means for respectively coupling said first and second sensing means to said control inputs of said first and second differential amplifier means.

3. A system as defined in claim 2, further including support means for said source of X-rays, said support means selectively positioning said source of X-rays such that said path of said projected field selectively extends substantially in a vertical direction and in a horizontal direction; and switching means operatively associated with said support means for disabling said second sensing means when said path of said projected field extends substantially in said horizontal direction.

4. A system as defined in claim 3 further including means for producing a constant biasing signal when said path of said projected field extends substantially in said horizontal direction and when the source-to-film distance reaches a predetermined value, said constant biasing signal influencing both said first and second signals produced by said first sensing means to compensate for a fixed source-to-film distance.

5. A system as defined in claim 1, wherein said first sensing means is carried within said film cassette holder, said film cassette holder comprising a pair of slidably mounted clamping means adapted to engage opposite sides of a film cassette and to center a film cassette within said film cassette holder, each of said pair of slidably mounted clamping means including a plurality of notches along one edge thereof defining a substantially staircase-like structure adapted to receive corner edges of a film cassette; a plurality of electrical switch means respectively carried adjacent said plurality of notches of one of said pair of clamping means, said plurality of electrical switch means being adapted to be actuated in pairs by the corner edges of a film cassette to produce said first signal indicative of film surface width; and additional electrical switch means selectively actuated at various positions of said pair of slidably mounted clamping means to produce said second signal indicative of film surface length.

References Cited
UNITED STATES PATENTS

| 3,048,700 | 8/1962 | Koerner et al. | 250—105 |
| 3,091,696 | 5/1963 | Peyser | 250—105 |
| 3,099,747 | 7/1963 | Thomas et al. | 250—105 |
| 3,130,313 | 4/1964 | Tilling | 250—105 |
| 3,150,263 | 9/1964 | Catlin | 250—68 |
| 3,206,604 | 9/1965 | Burchell | 250—105 |

RALPH G. NILSON, Primary Examiner

C. E. CHURCH, Assistant Examiner

U.S. Cl. X.R.
250—93